United States Patent
Gibson et al.

(10) Patent No.: US 7,099,623 B2
(45) Date of Patent: Aug. 29, 2006

(54) MANAGING SEARCHER AND TRACKER RESOURCES IN A WIRELESS COMMUNICATION DEVICE

(75) Inventors: R. Nicholson Gibson, Boulder, CO (US); Jon J. Anderson, Boulder, CO (US); Dianne Horn, Longmont, CO (US); Francis M. Ngai, Louisville, CO (US); Glenn Salaman, Lafayette, CO (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 10/327,334

(22) Filed: Dec. 20, 2002

(65) Prior Publication Data

US 2004/0121728 A1 Jun. 24, 2004

(51) Int. Cl.
*H04Q 7/20* (2006.01)

(52) U.S. Cl. .................. 455/12.1; 455/562.1; 455/13.3; 370/342; 370/328

(58) Field of Classification Search ................ 455/12.1, 455/13.3, 434, 574, 564; 370/328, 342
See application file for complete search history.

(56) References Cited

U.S. PATENT DOCUMENTS

| | | | | |
|---|---|---|---|---|
| 6,556,809 B1 | * | 4/2003 | Gross et al. | 455/12.1 |
| 6,731,909 B1 | * | 5/2004 | McLain et al. | 455/67.13 |
| 2002/0151274 A1 | * | 10/2002 | Rosen et al. | 455/12.1 |
| 2004/0014472 A1 | * | 1/2004 | de La Chapelle et al. | 455/429 |
| 2004/0184515 A1 | * | 9/2004 | Im | 375/148 |

* cited by examiner

*Primary Examiner*—Nick Corsaro
*Assistant Examiner*—Alan Gantt
(74) *Attorney, Agent, or Firm*—Phillip Wadsworth; Gregory D. Ogrod

(57) ABSTRACT

A Wireless Communication Device (WCD) includes multiple fingers that track one or more tracked transponder beams. Each tracked beam is from a respective tracked transponder. The WCD determines a tracked-beam searcher energy for each of the tracked beams, and an untracked-beam searcher energy for each of one or more untracked beams from each of the tracked transponders. The WCD attempts to determine a preferred one of the untracked beams that should become a tracked beam. This determination is made based on the tracked-beam and the untracked-beam searcher energies. The WCD assigns, or alternatively, reassigns, a finger to the preferred untracked beam when the attempt to determine a preferred untracked beam is successful. The transponders may be satellites or base stations.

40 Claims, 12 Drawing Sheets

MANAGING SEARCHER AND TRACKER RESOURCES IN A WIRELESS COMMUNICATION DEVICE

BACKGROUND OF THE INVENTION

I. Field of the Invention

The present invention relates generally to wireless communication devices (WCDs), and more particularly, to such a wireless communication device (WCD) capable of interacting with multiple beams in a satellite or a terrestrial based communication system.

II. Related Art

A known satellite communication system uses satellite beams from multiple communication satellites to provide communication signal connectivity between a large number of geographically distributed user satellite terminals and multiple satellite ground stations, referred to as gateways. At any given time, one or more satellite beams from one or more of the satellites illuminate each user terminal. A typical user terminal, also referred to herein as a wireless communication device (WCD), includes a finite number of satellite beam tracker resources, referred to as receiver "fingers." The receiver fingers track communication signals within the satellite beams illuminating the WCD. Typically, a finger tracks various characteristics of a communication signal, such as an energy level, a frequency offset, a spreading code offset when the signal is a spread spectrum signal, and so on, to enable the WCD to demodulate and recover information from the communication signal.

Relative motion between the satellites and a WCD creates a dynamic environment, wherein different satellite beams sweep past, and thus illuminate, the WCD over time. To accommodate this dynamic environment, it is desirable for the WCD to be able to allocate and reallocate the finite number of fingers between the different beams dynamically, whereby the WCD can maintain connectivity with the communication system over time. In other words, it is desirable for the WCD to be able to assign and reassign various ones of the fingers to the different satellite beams over time, so that at any given time, the fingers track the one or more satellite beams illuminating the WCD.

The ability of a finger to track a satellite beam successfully, that is, the ability of the finger to track the signals within the satellite beam, depends on an energy of the beam as received at the WCD. For example, the greater the beam energy, the greater is the ability of the finger to track the beam successfully. Therefore, it is desirable that the WCD allocate fingers to satellite beams dynamically, and in such a manner as to maximize the beam energies delivered to the fingers.

SUMMARY OF THE INVENTION

A feature of the present invention is to manage satellite beam tracker resources, such as fingers, in a WCD that interacts with a wireless communications system, such as a satellite communication system. The present invention allocates and reallocates the fingers between different satellite beams in the satellite communication system dynamically, whereby the WCD can maintain connectivity with the satellite communication system over time. In other words, the present invention assigns and reassigns various ones of the fingers to the different satellite beams over time, so that at any given time, the fingers track the one or more "best" satellite beams illuminating the WCD. The best beams are the best/easiest beams to demodulate, and may have the most beam energy, as measured at the WCD. Thus, the present invention allocates fingers to satellite beams dynamically, and in such a manner as to attempt to maximize the beam energies delivered to the fingers. This ensures successful beam tracking and demodulation as different satellite beams illuminate the WCD over time.

The present invention uses a searcher that operates concurrently with the fingers. The searcher includes an energy estimator for estimating beam energy received by, that is, illuminating, the WCD. The searcher also searches for beam energy levels indicating the presence of untracked beams illuminating the WCD, that is, beams that are not being tracked by fingers. The searcher is quick in that it performs such searches in a manner that is generally optimized for speed. Therefore, the searcher estimates beam energy and searches for the presence of untracked beams relatively quickly. Thus, while the fingers track their respectively assigned beams, the present invention uses the searcher to determine the best untracked (that is, unassigned) beams that should become tracked beams. The present invention uses the searcher and control logic to determine which untracked beams should become tracked beams, and when such untracked beams should become tracked beams. The present invention assigns, or alternatively, reassigns fingers to untracked beams that it has determined should become tracked beams. The present invention is referred to as a Finger-Searcher Manager (FSM).

One embodiment is a method of managing beam tracking assets in a WCD. The WCD includes multiple fingers that track one or more transponder beams, each originating from a respective one of one or more tracked transponders. The transponders may be satellites associated with a satellite communication system or base stations associated with a terrestrial based communication system. The method comprises determining a tracked-beam searcher energy for each of the tracked beams, and an untracked-beam searcher energy for each of one or more untracked beams from each of the tracked transponders. The method also comprises attempting to determine a preferred one of the untracked beams that should become a tracked beam. This determination is made based on the tracked-beam and the untracked-beam searcher energies. The method also comprises assigning, or alternatively, reassigning, a finger to the preferred untracked beam when the attempt to determine the preferred untracked beam is successful.

Another embodiment of the present invention is an apparatus for managing beam tracking assets in a WCD. The apparatus is based on the method embodiment described above. Other embodiments of the present invention will become apparent from the ensuing description.

BRIEF DESCRIPTION OF THE DRAWINGS

The features, objects, and advantages of the present invention will become more apparent from the detailed description set forth below when taken in conjunction with the drawings in which like reference characters identify the same or similar elements throughout and wherein.

DETAILED DESCRIPTION OF EMBODIMENTS
OF THE INVENTION

A variety of multiple access communication systems and techniques have been developed for transferring information among a large number of system users. However, spread spectrum modulation techniques, such as those used in code division multiple access (CDMA) communication systems provide significant advantages over other modulation schemes, especially when providing service for a large number of communication system users. Such techniques are disclosed in the teachings of U.S. Pat. No. 4,901,307, which issued Feb. 13, 1990 under the title "Spread Spectrum Multiple Access Communication System Using Satellite or Terrestrial Repeaters" to Gilhousen et al., which is incorporated herein by reference.

I. Example Communication Environment

Figure 1:
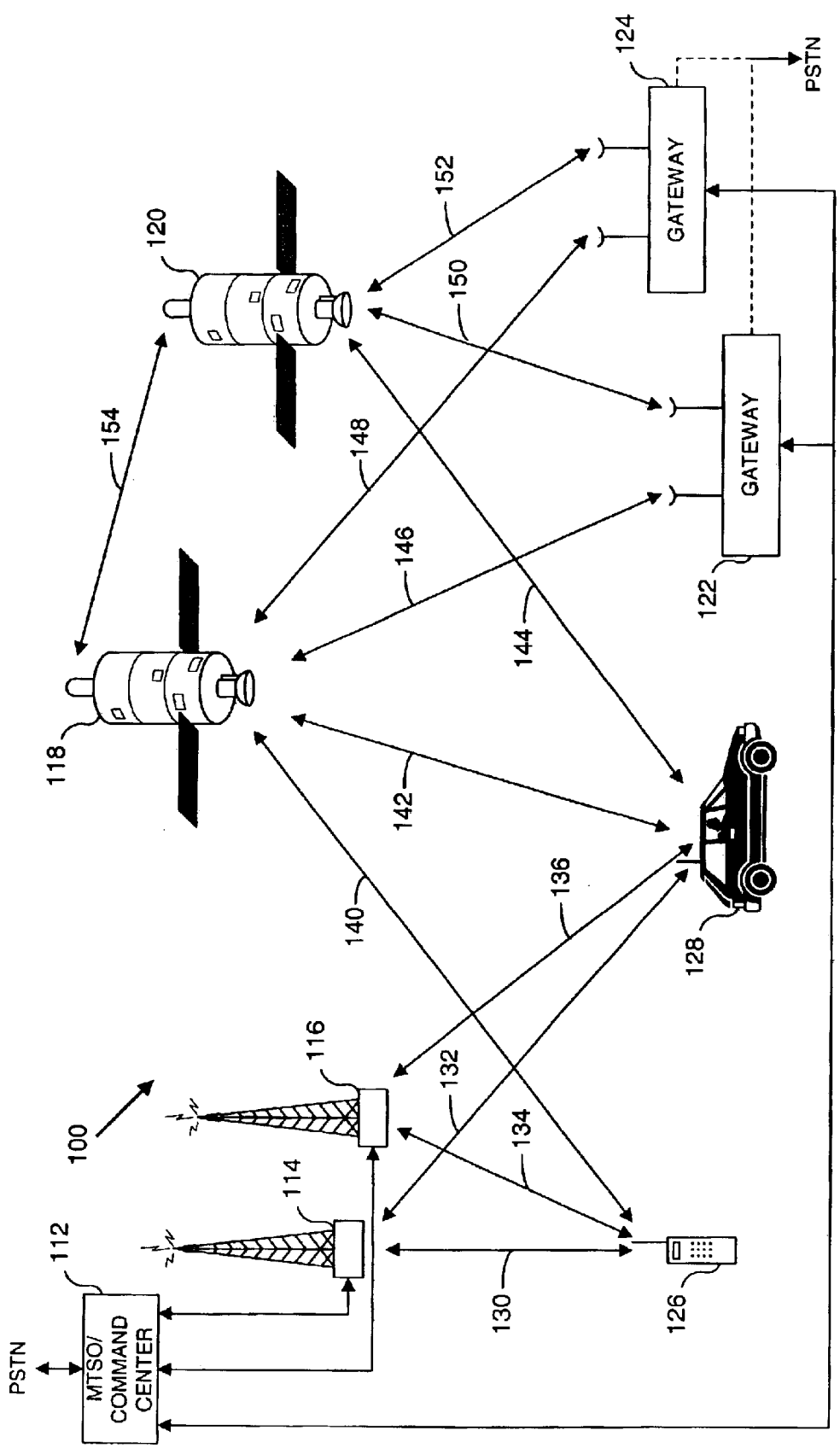
FIG. 1 is an example of a wireless communication system.

FIG. 1 is an example of a wireless communication system. A communication system 100 utilizes spread spectrum modulation techniques in communicating with WCDs 126 and 128 (also referred to as mobile stations, user terminals and user equipment). Communication system 100 can use spectrum modulation techniques as set forth in U.S. Pat. No. 4,901,307, mentioned above. In terrestrial systems, communication system 100 communicates with WCDs 126 and 128 using base stations (shown as base stations 114 and 116). Cellular telephone type systems in large metropolitan areas may have many base stations 114 and 116 serving thousands of WCDs 126 and 128.

In satellite-based systems, communication system 100 employs satellite repeaters (shown as satellites 118 and 120) and system gateways (shown as gateways 122 and 124) to communicate with WCDs 126 and 128. Gateways 122 and 124 send communication signals to WCDs 126 and 128 through satellites 118 and 120.

In this example, mobile stations or WCDs 126 and 128 each have or comprise apparatus or a wireless communication component/device such as, but not limited to, a cellular telephone, a data transceiver or a transfer device (e.g., computers, personal data assistants, facsimile) or a paging or position determination receiver. Typically, such units are either hand-held, portable as in vehicle mounted (including cars, trucks, boats, trains, and planes), or fixed, as desired. For example, FIG. 1 illustrates mobile station 126 as a hand-held device, and mobile station 128 as a vehicle-mounted device. While these WCDs are discussed as being mobile, it is also understood that the teachings of the invention are applicable to fixed units or other types of terminals where remote wireless service is desired. This latter type of service is particularly suited to using satellite repeaters to establish communication links in many remote areas of the world. WCDs are also sometimes referred to as subscriber units, mobile units, mobile stations, mobile radios or radiotelephones, wireless units, or simply "users," "mobiles," "subscribers," or "terminals" in some communication systems, depending on preference.

It is contemplated for this example that satellites 118 and 120 provide multiple beams within "footprints" that are directed to cover separate generally non-overlapping geographic regions. Generally, multiple beams at different frequencies, also referred to as CDMA channels, "sub-beams" or frequency division multiplexed (FDM) signals, frequency slots, or channels, can be directed to overlap the same region. However, it is readily understood that the beam coverage or service areas for different satellites, or antenna patterns for terrestrial cell-sites, may overlap completely or partially in a given region depending on the communication system design and the type of service being offered. Space diversity may also be achieved between any of these communication regions or devices. For example, each may provide service to different sets of users with different features at different frequencies, or a given mobile unit may use multiple frequencies and/or multiple service providers, each with overlapping geophysical coverage.

As illustrated in FIG. 1, communication system 100 generally uses a system controller and switch network 112, also referred to as a mobile telephone switching office (MTSO), in terrestrial systems and (Ground) Command and Control centers (GOCC) for satellite systems, which also communicate with the satellites. Such controllers typically include interface and processing circuitry for providing system-wide control for base stations 114 and 116 or gateways 122 and 124 over certain operations including pseudonoise (PN) code generation, assignments, and timing. Controller 112 also controls routing of communication links or telephone calls among a public switched telephone network (PSTN), and base stations 114 and 116 or gateways 122 and 124, and WCD 126 and 128. A PSTN interface generally forms part of each gateway for direct connection to such communication networks or links.

The communication links that couple controller 112 to various system base stations 114 and 116 or gateways 122 and 124 can be established using known techniques such as, but not limited to, dedicated telephone lines, optical fiber links, and microwave or dedicated satellite communications links.

While only two satellites are illustrated in FIG. 1, the communication system generally employs multiple satellites 118 and 120 traversing different orbital planes. A variety of multi-satellite communication systems have been proposed including those using a constellation of Low Earth Orbit (LEO) satellites for servicing a large number of WCDs. A working arrangement of system 100 uses at least forty-eight (48) LEO satellites distributed across eight (8) different orbital planes. However, those skilled in the art will readily understand how the teachings of the present invention are applicable to a variety of both terrestrial and satellite system configurations.

In FIG. 1, some of the possible signal paths for communication links between base stations 114 and 116 and WCDs 126 and 128 are illustrated as lines 130, 132, 134, and 136. The arrowheads on these lines illustrate exemplary signal directions for the link, as being either a forward or a reverse link, and serve as illustration only for purposes of clarity, and not as any restriction on the actual signal pattern.

In a similar manner, signal paths for communication links among gateways 122 and 124, satellite repeaters 118 and 120, and WCDs 126 and 128 are illustrated as lines 146, 148, 150, and 152 for gateway-to-satellite links and as lines 140, 142, and 144 for satellite-to-user links. In some configurations, it may also be possible and desirable to establish direct satellite-to-satellite links exemplified by line 154.

As will be apparent to one skilled in the art, embodiments are suited for either terrestrial-based systems or satellite-based systems. The terms base station and gateway are sometimes used interchangeably in the art, with gateways being perceived as specialized base stations that direct communications through satellites. Likewise, satellites 118 and 120 will be collectively referred to as satellite 118, and WCDs 126 and 128 will be collectively referred to as WCD 128. In the present embodiments, satellites 118 and 120 and base stations 114 and 116 represent, and are generally referred to as, transponders for originating beams that illuminate WCDs. For example, beams originated from satellites 118 and 120 (that is, transponders 118 and 120) illuminate WCDs within the footprints of the beams. Likewise, beams originated from (that is, transmitted by) base stations 114 and 116 (that is, transponders 114 and 116) illuminate user terminals WCDs within the footprint of the beams. The footprint of a beam originated from a base station may be thought of as the cell or zone of signal coverage, or one or more sectors, associated with that base station.

II. Signal Links

Each of the signal paths or links 130–152 depicted in FIG. 1 typically includes both a forward link and a reverse link. Each of the forward links delivers a set of forward link signals transmitted by base stations and gateways 114, 116, 122 and 124 to WCDs 126 and 128. Conversely, each of the reverse links delivers a set of reverse link signals transmitted by WCDs 126 and 128 to base stations and gateways 114, 116, 122 and 124. In the terrestrial environment, each of the base stations 114, 116 transmits a set of forward link signals. In the satellite environment, each of the gateways 122, 124 transmits multiple sets of forward link signals. Each set of forward link signals is associated with a different one of the multiple sub-beams mentioned above. Therefore, satellites 118, 120 each deliver multiple sub-beams (that is, sets of forward link signals) to the surface of the earth.

In the satellite environment, each of the gateways 122, 124 uses a forward link divided into multiple (for example, 8 or 16) beams, where each beam is further sub-divided into multiple (for example, 13) sub-beams, as FDM channels. Each sub-beam is associated with a set of forward link signals. Therefore, each satellite 118, 120 generates multiple sub-beams, and correspondingly, multiple sets of forward link signals, to the surface of the earth.

Figure 2:
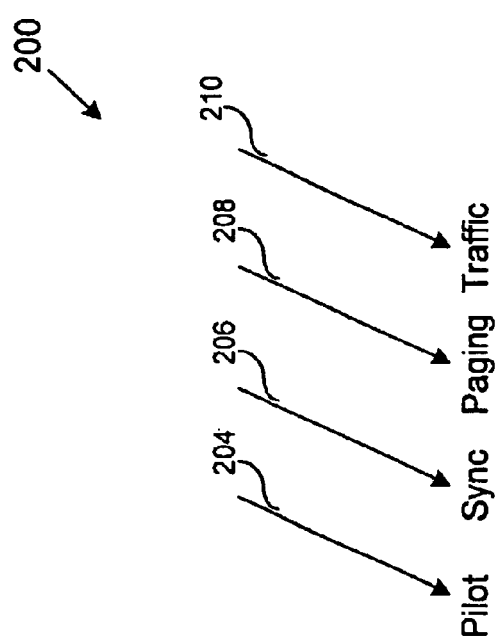
FIG. 2 is an illustration of an exemplary set of forward link signals delivered to a WCD of FIG. 1.

FIG. 2 is an illustration of an exemplary set of forward link signals 200 delivered to WCD 128. In the terrestrial environment, forward link signals 200 are transmitted from a base station (for example, base station 114 or 116). In the satellite environment, forward link signals 200 are transmitted up to a satellite (for example, satellite 118 or 120) from a gateway (for example, gateway 122 or 124) and then down from the satellite to a WCD (for example, WCD 126 or 128) over a particular sub-beam. Forward link signals 200 include one or more of the following signals: a pilot signal 204; a synchronization (sync) signal 206 associated with the pilot signal; at least one paging signal 208 associated with the pilot signal, and one or more voice and/or data traffic signals 210. Pilot signal 204, sync signal 206, paging signal 208, and traffic signals 210 are also referred to in the art as pilot channel signal 204, sync channel signal 206, paging channel signal 208, and traffic channel signals 210, respectively.

In the terrestrial environment, each base station transmits a respective pilot signal (for example, pilot signal 204). The pilot signal is used by the WCDs (for example, WCD 128) to acquire initial system synchronization and to provide robust time, frequency, and phase tracking of the other forward link signals transmitted by the base station. The pilot signal transmitted by each base station uses a common spreading code, such as a PN sequence, but a different code offset (also referred to as a phase offset), thereby enabling the WCD to distinguish between the pilot signals transmitted from respective base stations.

Similarly, in the satellite environment, each gateway or satellite can be associated with a predetermined code, such as a PN sequence, which may be the same or different from the codes associated with the other satellites or gateways. For example, each beam associated with a given satellite includes a pilot signal that is spread using the predetermined code for the given satellite (subject to re-use among satellites not in view), but having a different code phase offset from the other beams from that satellite. Therefore, a WCD can distinguish between different satellites that use different codes, and between the different beams associated with a given satellite that use different code phase offsets or associated timing. For example, in a working arrangement of system 100:

a) different satellite orbital planes (for example, 8 different orbital planes) are associated with different codes (for example, each orbital plane is associated with a respective one of 8 different PN codes), and typically, satellites from one or more orbital planes effectively illuminate a WCD at any given time;

b) all of the satellites within the same orbital plane share a common code; and c) all of the beams of a given satellite share a common code, but each beam is associated with a different code offset.

Alternatively, each plane can be separated into a series of codes alternating between successive satellites in orbit to provide better differentiation. For example 6 satellites in one plane may use two or three codes to be distinguishable fm other satellites in view, subject to code reuse across the orbital planes.

Sync signal 206 is a modulated spread spectrum signal, including system timing messages used by WCD 128 to acquire an overall communication system time associated with communication system 100. Sync signal 206 is spread using a code, such as PN code, that is related to the code used to spread associated pilot signal 204. Once pilot signal 206 has been acquired by WCD 128, the WCD acquires sync signal 206, thereby permitting the WCD to synchronize timing internal to the WCD with the overall system time.

Paging signal 208 is a modulated spread spectrum signal used to deliver messages to WCDs. A paging signal 208 is spread using a code, such as a PN code, that is related to the code used to spread associated pilot signal 204. Each of the traffic signals 210 is a modulated spread spectrum signal used to transfer voice and/or data to/from the WCDs. The traffic signals are spread using codes, such as PN codes, that are related to the code used to spread associated pilot signal 204.

For descriptive convenience, the discussion above associates only one code with each of the sync, pilot and paging signals. However it is to be understood that one or more codes (for example, a set of codes, including an "inner code," an "outer code," and/or a Walsh code) are typically used to spread and/or channelize each of these signals, and that the set of codes associated with each signal is also used to synchronize with, despread, and de-channelize that signal.

In the working arrangement of system 100, each spreading code, for example, each PN sequence, includes a sequence of "chips" extending over a predetermined code period, and having a chip rate (that is, frequency) much greater than a data rate of a baseband signal being spread using the chips. An exemplary chip rate for system 100 is approximately 1.2288 MegaHertz (MHz), with a code sequence length of 1024 chips.

III. WCD Receiver

Figure 3:
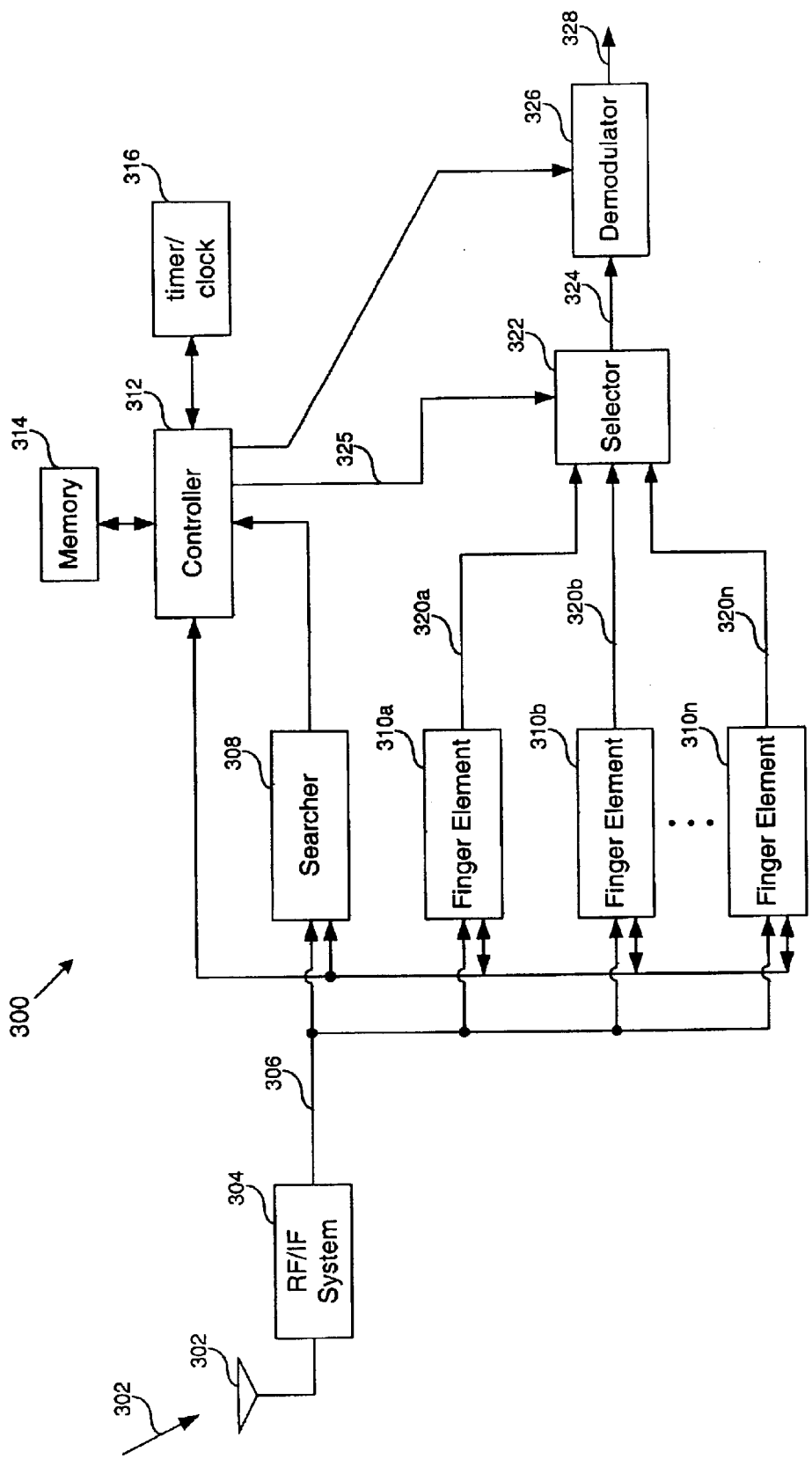
FIG. 3 is a block diagram of an example receiver in a WCD of FIG. 1 capable of processing CDMA signals.

FIG. 3 is a block diagram of an example receiver 300 of WCD 128 for processing CDMA signals used in system 100. Receiver 300 includes an antenna system 302 for receiving forward link radio frequency (RF) signals (such as pilot, sync, paging, and traffic signals 204, 206, 208 and 210), and for delivering the signals to an RF/intermediate frequency (IF) system 304, when used. RF/IF system 304 filters, frequency-downconverts and digitizes the RF signals, and delivers a resulting digitized signal 306 to a searcher unit 308 and a plurality of receiver fingers or finger elements 310a. . . 310n.

Searcher 308 detects/acquires pilot signals included in digitized signal 306. That is, searcher 308 identifies (or at least begins to identify) substantially optimal code phase offsets of the received pilot signals, to initially synchronize receiver 300 to the pilot signals. Also, in the present invention, searcher 308 searches for candidate signals in digitized signal 306. The candidate signals represent candidate beams for fingers 310 to track. Further functions of searcher 308 will be described below.

Searcher 308 reports search results to a receiver controller 312 coupled to the searcher and finger elements 310. Typically, controller 312 includes a processor and is coupled to a memory 314. Controller 312 is also coupled to a counter/timer 316 used to maintain time in receiver 300. The processor may be implemented in a software-controlled processor programmed to perform the functions described herein. Such implementations may include well known standard elements or generalized function or general purpose hardware including a variety of digital signal processors (DSPs), programmable electronic devices, or computers that operate under the control of software instructions perform the desired functions Based on the search/signal acquisition results reported by searcher 308, controller 312 configures each of finger elements 310 to track and at least partially despread various ones of the forward link signals (such as one or more paging signals) most likely being received by receiver 300 at any given time. Controller 312 can configure a finger to track a signal by providing to the finger a code (referred to as a designated code) that the finger uses to despread the signal to be tracked (also referred to as the designated signal), and a code offset of the designated signal. The designated code is one that is assume to have been used at the gateway to initially spread the designated signal.

Finger elements 310 deliver respective despread signals 320a–320n (for example, despread paging signals) to a selector/multiplexer 322 controlled by controller 312. In accordance with a command 325 from controller 312, selector 322 routes a selected one of the despread signals 320 (designated as signal 324 in FIG. 3) to a demodulator 326. Controller 312 configures demodulator 326 to demodulate the designated signal, for example, by providing the demodulator with a code associated with the signal, and timing information related to the code phase offset of the signal to be demodulated. In response, demodulator 326 demodulates selected, despread signal 324, to produce a demodulated signal 328 (such as a demodulated paging signal). Demodulator 326 may provide demodulated signal 328 to controller 312.

In an alternative arrangement of receiver 300, each of the fingers 310 includes demodulator functionality, whereby each finger can both track and demodulate a respective signal. In this arrangement, separate demodulator 326 is omitted, and selector 322 is modified to selectively route one of the finger outputs 320 to controller 312. In another alternative arrangement of receiver 300, searcher 308 includes both tracking and limited demodulating capability.

A. Finger

Figure 4A:
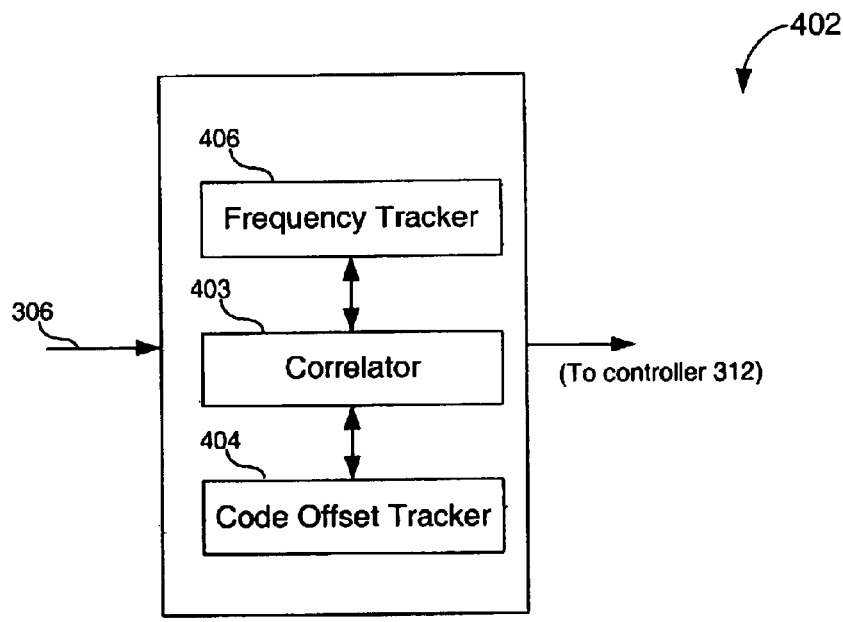
FIG. 4A is a block diagram of an example tracking resource or finger used in the receiver of FIG. 3.

FIG. 4A is a block diagram of an example finger 402 corresponding to one or more of fingers 310. Finger 402 includes a correlator 403, a code offset or phase tracker 404 coupled to correlator 403, and a frequency tracker 406 also coupled to correlator 403. Phase and frequency trackers 404 and 406 derive correlator timing adjustment signals. Correlator 403 correlates, and thus despreads, a received signal with one or more code sequences provided to finger 402. Also, correlator 403 despreads the received signal in response to the correlator timing adjustment signals derived by phase and frequency trackers 404 and 406.

Phase tracker 404 includes a phase tracking loop to track a phase or code offset of the received signal. Frequency tracker 406 includes a frequency tracking loop to track a Doppler frequency offset from a designated center frequency of the received signal. The Doppler frequency offset in the received signal results from relative motion between receiver 300 and a signal source such as a satellite originating the received signal.

B. Searcher

Figure 4B:
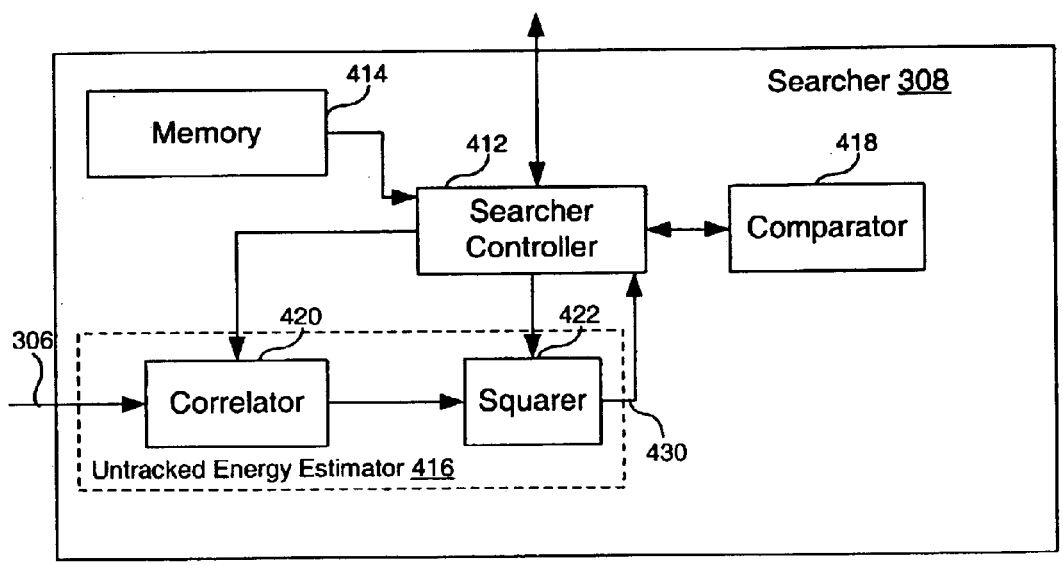
FIG. 4B is a block diagram of an example searcher in the receiver of FIG. 3.

FIG. 4B is a block diagram of an example arrangement of searcher 308. Searcher 308 includes a searcher controller 412 coupled to receiver controller 312 and a local searcher memory 414. Searcher 308 also includes an untracked energy estimator 416 and a comparer or comparison module 418 (also referred to as a comparator 418, or a comparison means), both coupled to searcher controller 412.

Untracked energy estimator 416 includes a correlator 420 followed by a signal squarer 422. Energy estimator 416 uses correlator 420 and signal squarer 422 to accumulate/integrate energy in digitized signal 306 within a predetermined code-frequency search window, and over a programmable time duration, to determine an energy estimate 430. For example, energy estimator 416 integrates energy in one or more received signals included in signal 306, to produce energy estimate 430.

To produce energy estimate 430, correlator 420 correlates the one or more received signals with one or more code sequences provided to searcher 308, to produce a correlation result. Squarer 422 squares the correlation result to produce energy estimate 430, and provides the energy estimate to controller 412. Energy estimate 430 (also referred to as searcher energy 430) represents an "untracked energy" because it is determined without using phase and/or frequency tracking loops, as would have been the case if finger 402 had made the energy estimate, for example. Since searcher 308 does not use phase and/or frequency tracking loops, it can determine a useable energy estimate 430 in a shorter period of time than can finger 402.

Thus, an advantage of searcher 308 is that it searches received signal 312 to determine received signal energy estimate 430 relatively quickly. To further reduce the time taken to determine estimate 430 in the present embodiments, searcher 308 integrates beam energy over several signals within a beam. For example, searcher 308 integrates energy for a pilot signal, a sync signal, and a paging signal, combined, over a programmed time period, for example, over a time period corresponding to a multiple of 64 chips. Thus, searcher 308 combines energy from different signals within a beam in order to reduce the time required to build the useable beam energy estimate 430. In contrast, a finger builds energy based on only a single tracked signal within a beam at any given time, such as a sync, paging, or traffic signal. By integrating energy over several signals within a beam, energy estimator 416 can generate a meaningful untracked energy estimate 430, that is, a beam energy estimate that can be used, in as little as 1 millisecond (ms), for example.

Local controller 412 uses comparator 418 to compare searcher energy(s) 430 to searcher energy thresholds, and to other beam energy estimates represented as other energy estimates 430, to produce comparison results. Based on such comparison results, local controller 412 can determine the presence or absence of a received beam, the existence of beam switch conditions, and "best" beams associated with maximum beam energy estimates. In an alternative arrangement, searcher energy estimates 430 are provided directly to receiver controller 312, and controller 312 compares the estimates to the energy thresholds and other beam energy estimates.

IV. Search Window

Figure 5:
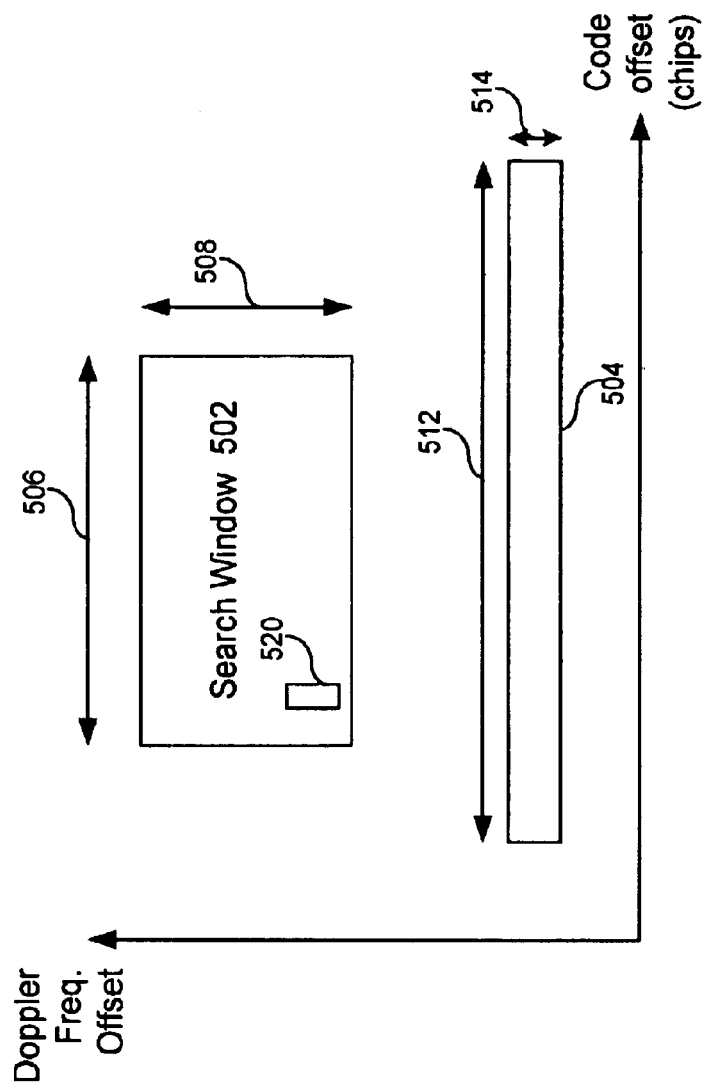
FIG. 5 is an illustration of two example, different sized code-frequency search windows used with the searcher of FIG. 4B.

For a given code (for example, a PN code), searcher 308 accumulates energy over time at different code offsets within a predetermined range of code offsets, and at different doppler frequency offsets within a predetermined range of frequency offsets. For the given code, the predetermined code and frequency offset ranges to be searched together define a code-frequency search window. FIG. 5 is an illustration of two example, different sized code-frequency search windows 502 and 504. Search window 502 is defined by a code offset range 506 and a frequency offset range 508. Similarly, search window 504 is defined by a code offset range 512 and a frequency offset range 514. At any given time, searcher 308 accumulates energy at a specific code-frequency position, for example, position 520, within a search window. The energy accumulated by searcher 308 at different code-frequency positions, and thus, integrated into energy estimate 430, varies depending on the level of correlation between the code-frequency position being searched and the received signal code, code offset, and frequency offset.

A. Example Scenario

Figure 6:
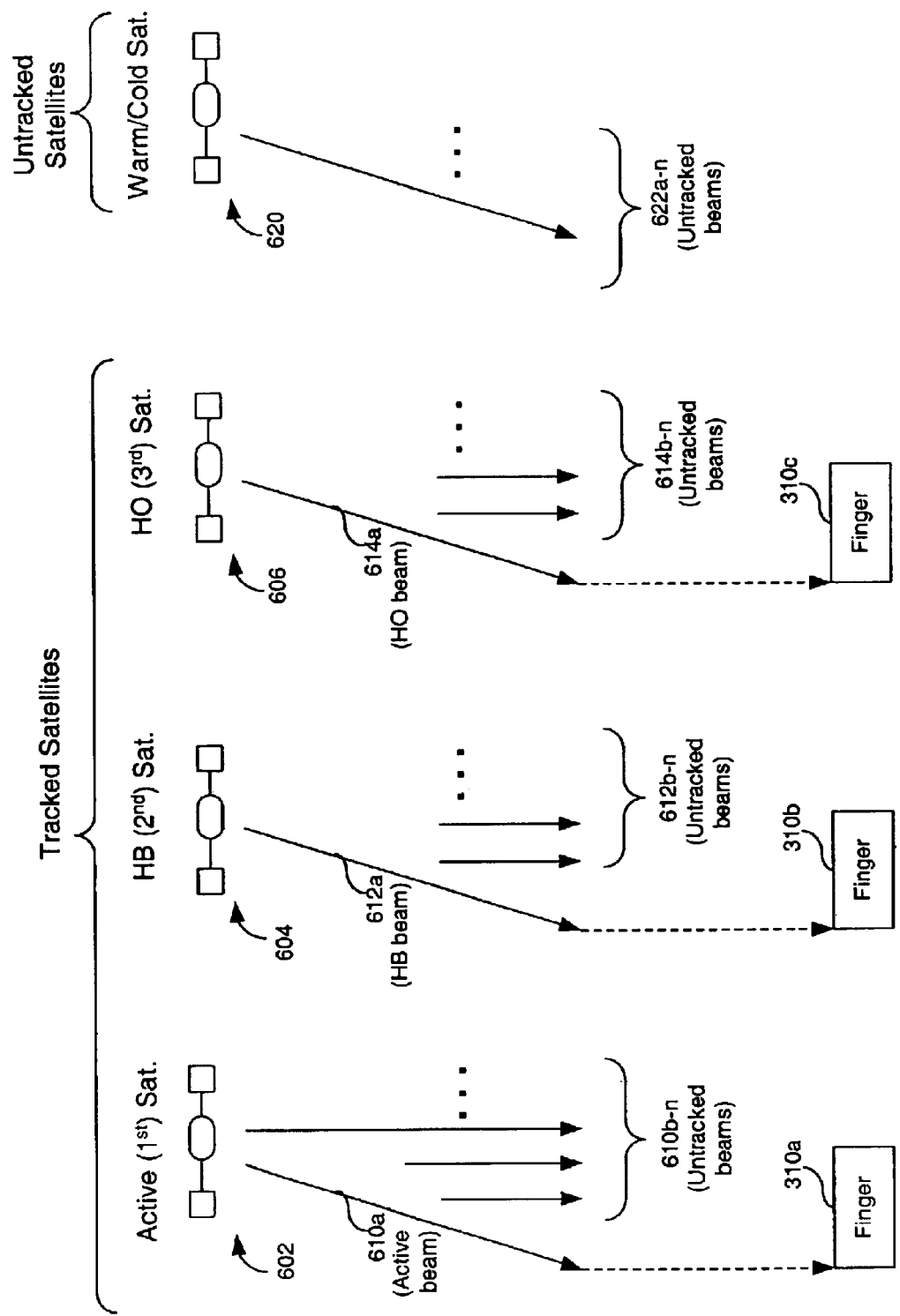
FIG. 6 is an illustration of an example communication system scenario, including first, second and third respective tracked satellites, each in view of the receiver of FIG. 3.

The methods of the embodiments are described with reference to an illustrative scenario, that is, with reference to an example communication system and receiver configuration/scenario. FIG. 6 is an illustration of an example communication system and receiver scenario 600, including first, second and third respective tracked satellites 602, 604, and 606, each in view of receiver 300. Each satellite traverses an orbital plane different from the other satellites, and is, thus, associated with a unique identifying code. Satellites 602, 604, and 606 originate respective pluralities of beams 610a–610n, 612a–612n, and 614a–614n. Untracked satellite 620, which may or may not be in view of receiver 300, originates a plurality of beams 622a–622n.

In the example receiver configuration, receiver 300 includes three fingers, namely, fingers 310a, 310b, and 310c.

Controller 312 assigns each of receiver fingers 310a–310c to track a beam from a respective one of a plurality of satellites. This means that each finger tracks a signal, such as a pilot, paging, or traffic signal within the beam assigned to that finger. For example, fingers 310a, 310b, and 310c track respective beams 610a, 612a, and 614a. It is assumed that beams 610a, 612a, and 614a have respective decreasing beam energies, as determined/measured at receiver 300. Thus, beams 610a, 612a, and 614a are designated respectively as a preferred (or best) beam, a second best beam, and a third best beam. Since beam 610a has a maximum energy, controller 312 configures selector 322 and demodulator 326 to demodulate the signal tracked by finger 610a, that is, the output of finger 310a. In other words, controller 312 configures receiver 300 to demodulate beam 610a.

Since receiver 300 currently tracks and actively demodulates beam 610a, this beam is designated as an Active beam, and satellite 602 as the Active satellite. If beam 610a becomes unavailable, then controller 312 can reconfigure receiver 300 to demodulate the second best currently tracked beam, for example, beam 612a, whereby beam 612a will become the Active beam. Thus, beam 612a is designated as a Hot Backup (HB) beam, and satellite 604 as the HB satellite. If both beams 610a and 612a become unavailable, then controller 312 can reconfigure receiver 300 to demodulate the third best currently tracked beam, for example, beam 614a, whereby beam 614a becomes the Active beam. Thus, beam 614a is designated as a Hot Other (HO) satellite. Essentially, HB beam 612a and HO beam 614a are backup beams to the presently Active beam 610a. A result of this operation is to maximize satellite diversity in the system depicted in FIG. 6.

Since fingers 310 track beams 610a, 612a, and 614a, these beams are referred to herein as tracked beams, and their respective originating satellites 602, 604, and 606 as tracked satellites (since each of these satellites originates at least one tracked beam). On the other hand, remaining beams 610b–610n, 612b–612n, and 614b–614n are untracked, and are, thus, referred to herein as untracked beams.

Fourth satellite 620 is referred to herein as an untracked satellite because none of its beams 622a–622n are being tracked. If satellite 620 was recently a tracked satellite, then it is classified as a "warm" satellite because tracking information relating to the satellite (such as frequency and code phase offsets), and stored in receiver 300 is fairly recent (that is, warm). Such "warm" information may be useful in reacquiring signals from satellite 620. On the other hand, if satellite 620 was not recently a tracked satellite, then it is classified as a "cold" satellite because the related tracking information stored in receiver 300 is old, and perhaps useless. Also, satellite 620 may have never been "seen" by receiver 300.

The illustrative scenario of FIG. 6 corresponds to a satellite based communications system. That is, transponders 602–620 are satellites and beams 610, 612, 614, and 622 are satellite beams. However, a second illustrative scenario corresponds to terrestrial based communications. In such a scenario, transponders 602–620 are base stations and beams 610, 612, 614 and 622 are beams originating from the base stations.

V. Methods

A. Managing Searcher and Tracker Resources

Figure 7:
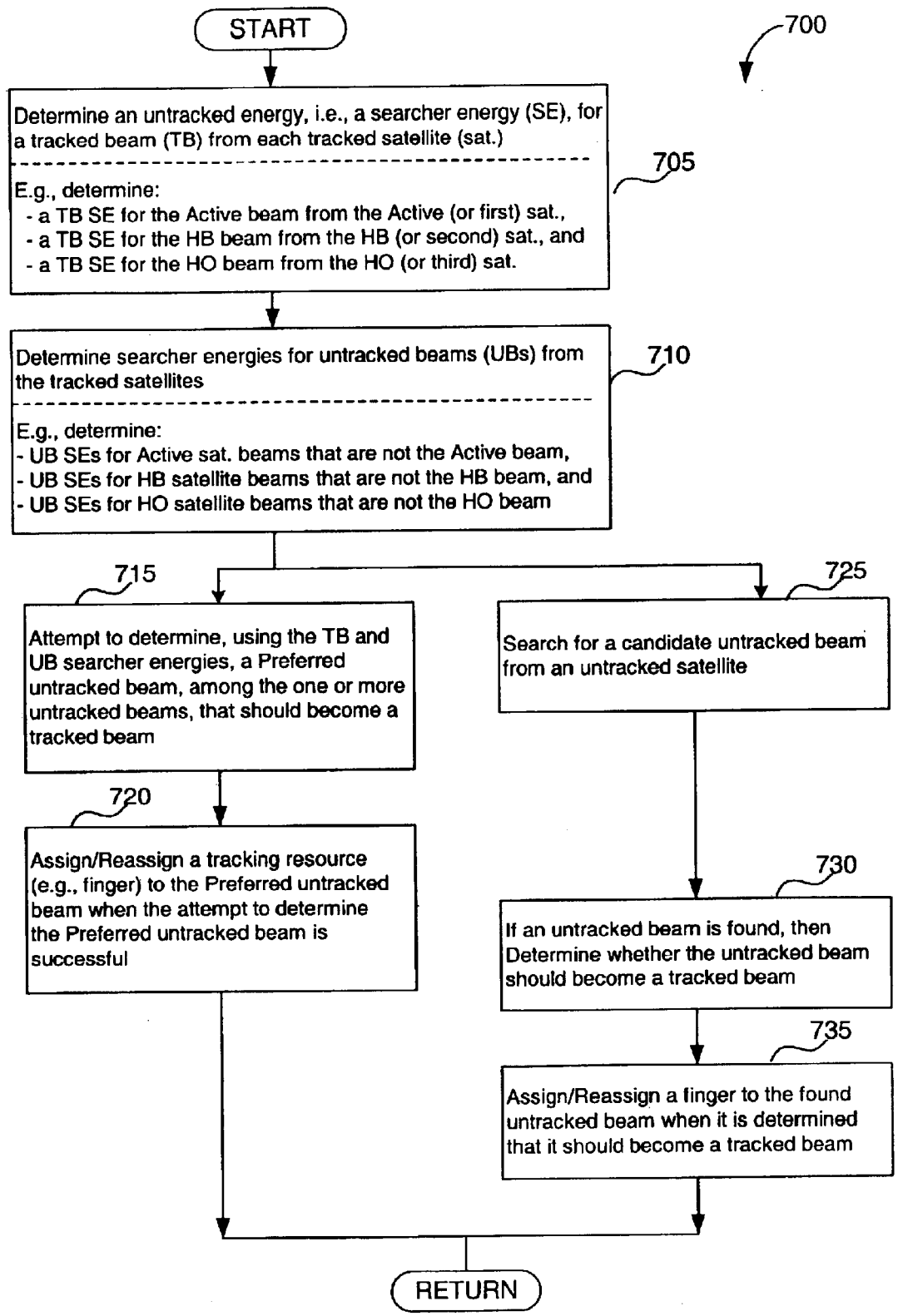
FIG. 7 is a flowchart of an example method of managing searcher and finger resources in the receiver of FIG. 3.

FIG. 7 is a flowchart of an example method 700 of managing searcher and finger resources in receiver 300, such as searcher 308 and fingers 310. Method 700 assigns and reassigns various ones of fingers 310 in receiver 300 to different transponder beams (that is satellite or base station beams) over time, so that at any given time, the fingers track the one or more "best" beams illuminating WCD 128. Method 700 represents a steady state operation of WCD 128, and is described with reference to example scenario 600 discussed above, for illustrative purposes. Although various methods are described below with reference to the example satellite based scenario of FIG. 6 (which uses satellite transponders), it is to be understood that the methods also apply to terrestrial based scenarios (which use base station transponders). Method 700 assumes that one or more of fingers 310 are presently assigned to track respective tracked beams from tracked satellites, as depicted in scenario 600, for example.

A first step 705 includes determining a searcher energy (SE) (that is, an untracked energy), for a tracked beam (TB) from each of one or more tracked satellites. In FIG. 7, each energy is referred to as a tracked beam searcher energy (TB SE). For example, searcher 308 determines a searcher energy (for example, energy estimate 430) for Active beam 610*a* from Active satellite 602, a searcher energy for HB beam 612*a* from HB satellite 604, and a searcher energy for HO beam 614*a* from HO satellite 606. Although beams 610*a*, 612*a* and 614*a* are tracked beams, their corresponding searcher energies are determined by searcher 308 using an untracked technique, as described above in connection with FIG. 4B. For example, the searcher energies are determined without the benefit of timing information from phase and frequency tracking loops.

A next step 710 includes determining searcher energies for one or more untracked beams (UBs) from each of the tracked satellites. For example, searcher 308 determines searcher energies for untracked beams 610*b*–610*n* from Active satellite 602, searcher energies for untracked beams 612*b*–612*n* from HB satellite 604, and searcher energies for untracked beams 614*b*–614*n* from HO satellite 606. Steps 705 and 710 together generate a table listing all of the determined searcher energies. The table of searcher energies may be stored in local searcher memory 414, for example.

In an example arrangement of method 700, to reduce the time taken to determine the searcher energies in steps 705 and 710, searcher 308 determines the searcher energy for each beam using energy from a pilot signal, a sync signal, and a paging signal, combined, for that beam. In an alternative arrangement, the searcher determines each beam energy using a lesser number of signals within that beam.

Following step 710, method 700 performs a first process including steps 715 and 720, and a second process including steps 725, 730, and 735, concurrent with each other. In the first process, initial step 715 includes attempting to determine a preferred untracked beam from among the one or more untracked beams, that should become a tracked beam. Step 715 attempts to determine the preferred untracked beam using the tabulated tracked beam and untracked beam searcher energies from steps 705 and 710. For example, step 715 attempts to determine a preferred one of untracked beams 610*b*–610*n*, 612*b*–612*n*, and 614*b*–614*n*, that qualifies for becoming a tracked beam. Step 715 bases this determination on the searcher energies collected in both steps 705 and 710.

Next step 720 includes assigning/reassigning a tracking resource (for example, a finger) to the preferred untracked beam when the attempt to determine the preferred untracked beam in step 715 is successful, whereby the preferred untracked beam becomes a tracked beam. If all of fingers 310 are currently assigned to track respective tracked beams when the preferred beam is determined in step 715, then step 720 includes reassigning one of the fingers to track the preferred untracked beam instead of the currently assigned tracked beam. In other words, the preferred untracked beam replaces one of the tracked beams. On the other hand, if one or more of fingers 310 are available (that is, unassigned) when receiver 300 determines the preferred beam, then one of the available fingers is assigned to track the preferred beam. If step 720 is unsuccessful, that is, no preferred untracked beam is identified, then no untracked beam becomes a tracked beam. The method or process flow returns after step 720.

In a dynamic satellite environment, tracked satellites tend to move out of view of WCD 128 over time, while untracked satellites, such as warm and cold satellites, move into view of the WCD. Thus, to ensure WCD 128 remains connected with communication system 100 over time, it is important for the WCD to identify beam energy from the warm and cold untracked satellites as they begin to illuminate or communicate with the WCD. Thus, the second process identifies the warm and cold satellites as they come into view of WCD 128.

The first process described above (that is, steps 715 and 720) does not require searcher 308 to continue determining search energies, because the searcher energies used in the first process were already determined in previous steps 705 and 710. Therefore, searcher 308 is available to perform "other" searching in parallel with the first process. Specifically, searcher 308 can search for beam energies, and, thus, beams, concurrent with the first process. Accordingly, in the second process, a first step 725 includes searching for a candidate untracked beam from an untracked satellite, such as a warm satellite or a cold satellite. In step 725, searcher 308 integrates energy in a code-frequency search window corresponding to the candidate untracked beam from the untracked satellite, to produce candidate beam searcher energy estimates (for example, estimates 430). In the context of scenario 600, searcher 308 searches received signal 306 for the presence of beam energy corresponding to one of untracked beams 622*a*–622*n* from untracked satellite 620. Searcher 308 uses comparator 418 to compare the candidate beam energy estimates to a "found beam energy threshold" indicative of the presence of an untracked beam from an untracked satellite. If a candidate beam energy estimate exceeds the found beam energy threshold, then a "found beam" is declared.

In step 725, searcher 308 uses a relatively large code-frequency search window when searching for a candidate beam from a cold satellite. For example, the large search window may have respective frequency offset and PN code offset ranges up to 23 kHz and up to a 1023 chip hypothesis. On the other hand, searcher 308 uses a relatively small code-frequency search window when searching for a candidate beam from a warm satellite. The small code-frequency search window encompasses a last known "warm" code-frequency position of a beam from the warm satellite. For example, the small search window may have respective frequency offset and PN code offset ranges of less than 23 kHz and a 64 chip hypothesis, centered around the last known code-frequency position of the warm satellite beam.

If a candidate untracked beam is found in step 725, then step 730 includes determining whether the candidate untracked beam should become a tracked beam. For example, step 730 includes determining whether or not one of found beams 622*a*–622*n* should become a tracked beam. This determination is made based on at least one of (a) the found beam searcher energy estimate (for example, for one of beams 622*a*–622*n*), and (b) whether step 715 selected a preferred beam in the first process.

Next step 735, similar to step 720, includes assigning/reassigning a tracking resource (for example, a finger) to the found untracked beam when it is determined that it should become a tracked beam. Process flow returns after step 735.

Figure 8:
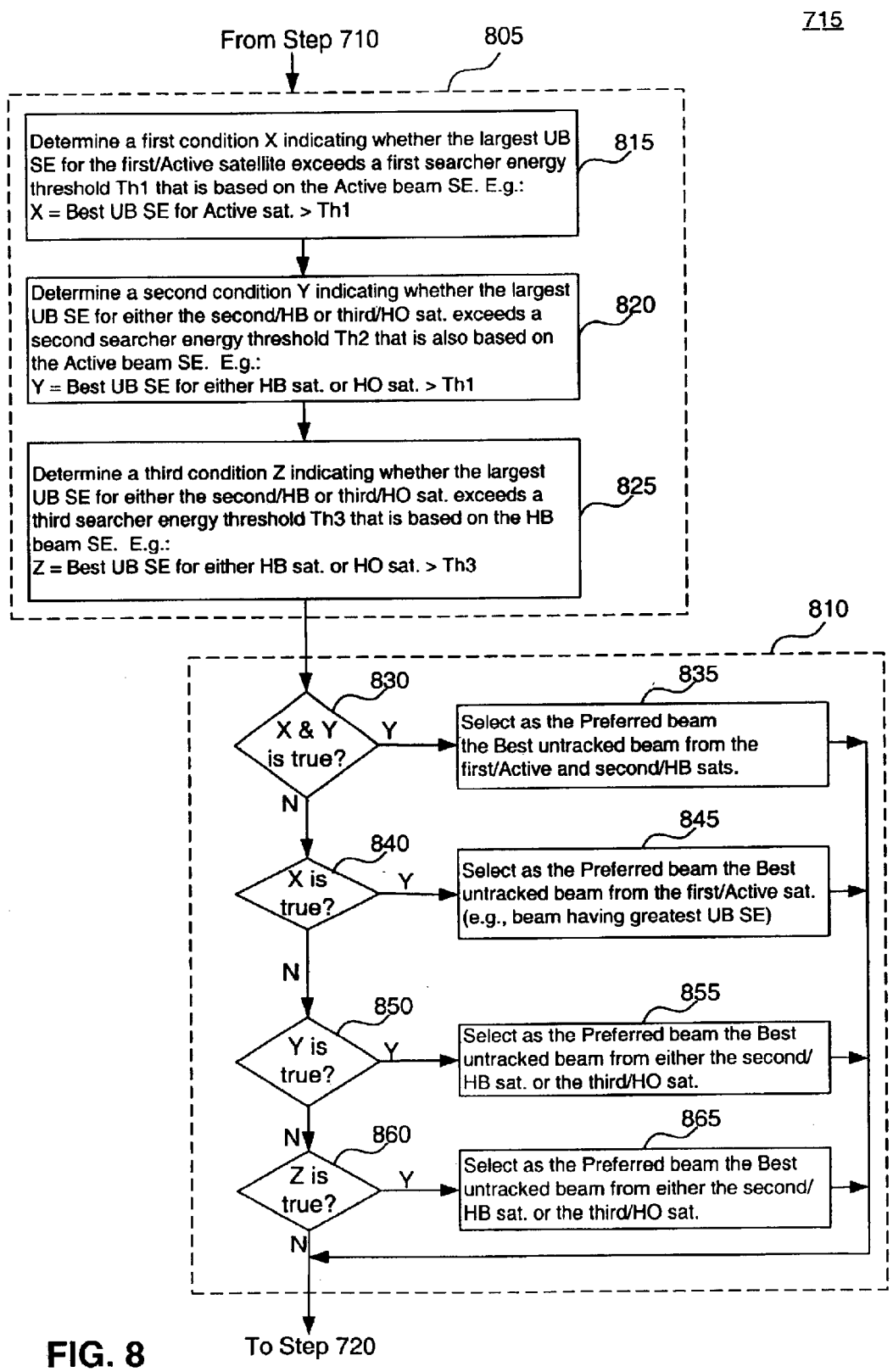
FIG. 8 is a flowchart of an example method expanding on the method of FIG. 7.

FIG. 8 is a flowchart of an example method expanding on step 715 (the step of attempting to determine a preferred beam), described above. Step 715 includes a first high-level step 805 followed by a second high-level step 810. High-level step 805 includes determining whether or not a largest untracked beam searcher energy (UB SE) for each of the tracked satellites exceeds a respective searcher energy threshold. High-level step 805 includes further steps 815, 820, and 825. Steps 815, 820, and 825 are described in the context of example scenario 600.

Step 815 includes determining a first Boolean condition X indicating whether or not a largest untracked beam searcher energy for Active satellite 602 exceeds a first searcher energy threshold Th1 that is based on the tracked beam searcher energy of Active satellite 602. In other words, step 815 determines whether a "best" one of untracked beams 610*b*–610*n* has a searcher energy greater than threshold Th1, which is based on the searcher energy of tracked beam 610*a*. The "best" untracked beam is the untracked beam having the greatest/maximum searcher energy among the untracked beams. An example threshold Th1 is the searcher energy of Active beam 610*a*, offset by a first constant, such as −2 dB, for example.

Step 820 includes determining a second Boolean condition Y indicating whether or not a largest untracked beam searcher energy for either HB satellite 604 or HO satellite 606 exceeds a second searcher energy threshold Th2 that is also based on the searcher energy of Active beam 610*a*. In other words, step 820 determines whether or not a best one of untracked beams 612*b*–612*n* or a best one of untracked beams 614*b*–614*n* has a searcher energy greater than threshold Th2, which is based on the searcher energy of tracked beam 610*a*. An example value for threshold Th2 is equal to the searcher energy of Active beam 610*a*, offset by a second constant, such as +1 dB, for example.

Step 825 is similar to step 820, but uses a third threshold Th3. Specifically, step 825, includes determining a third Boolean condition Z indicating whether or not a largest untracked beam searcher energy for either HB satellite 604 or HO satellite 606 exceeds third searcher energy threshold Th3 that is based on the searcher energy of HB beam 612*a*, instead of Active beam 610*a* as is the case with the first and second thresholds Th1 and Th2. In other words, step 825 determines whether or not a best one of untracked beams 612*b*–612*n* or a best one of untracked beams 614*b*–614*n* has a searcher energy greater than threshold Th3, which is based on the searcher energy of HB beam 612*a*. An example value for threshold Th3 is equal to the searcher energy of HB beam 612*a*.

Step 805 can be considered a step of determining beam-switch conditions X, Y, and Z because conditions X, Y, and Z indicate whether an untracked beam should become a tracked beam, and thus, whether one of fingers 310 should switch from tracking a tracked beam to tracking an untracked beam.

Next high level step 810 includes a series of tests 830, 840, 850, and 860 for testing Boolean (beam-switch) conditions X, Y, and Z determined in step 805. Step 830 includes determining whether or not X AND Y is true. If X AND Y is true, then a next step 835 includes selecting, as the preferred beam (which is the untracked beam that should become a tracked beam), a best untracked beam among the untracked beams from Active satellite 602 and HB satellite 604. For example, step 835 selects a best beam from among untracked beams 610*b*–610*n* and 612*b*–612*n*. After step 835, process flow proceeds to step 720.

If X AND Y is not true, then step 840 determines whether condition X is true. If condition X is true, then a next step 845 includes selecting as the preferred beam the best untracked beam from Active satellite 602. For example, the preferred beam becomes the best one of untracked beams 610*b*–610*n*. Flow proceeds from step 845 to step 720.

If X is not true, then step 850 determines whether condition Y is true. If condition Y is true, then a next step 855 includes selecting as the preferred beam the best untracked beam from either HB satellite 604 or HO satellite 606. For example, the preferred beam becomes either the best one of untracked beams 612*b*–612*n* or the best one of untracked beams 614*b*–614*n*. Flow proceeds from step 855 to step 720.

If condition Y is not true, then step 860 determines whether or not condition Z is true. If condition Z is true, then a next step 865 selects as a preferred beam the best untracked beam from either HB satellite 604 or HO satellite 606. For example, the preferred beam becomes either the best one of untracked beams 612*b*–612*n* or the best one of untracked beams 614*b*–614*n*. Flow proceeds from step 865 to step 720.

Figure 9:
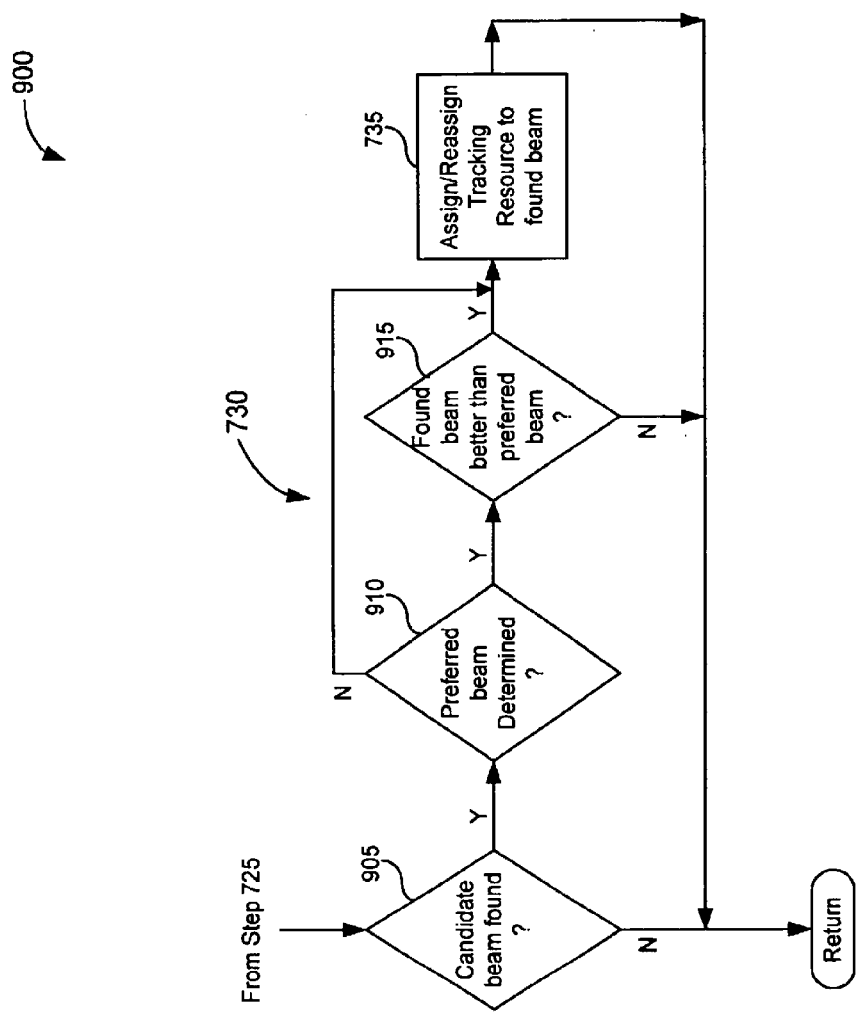
FIG. 9 is a flowchart of an example method further expanding on the method of FIG. 7.

FIG. 9 is a flowchart of an example method 900 expanding on step 730 of method 700 and also including step 735. Step 730 includes a series of test/determining steps 905, 910 and 915 leading to step 735. Step 905 includes determining whether or not a candidate beam was found in step 725. For example, step 905 includes determining whether step 725 declared a "found beam".

If no candidate beam was found, the method processing or process flow returns. However, if a candidate beam was found, then processing or flow proceeds to step 910. Step 910 includes determining whether or not a preferred beam was determined/selected in step 715 of the first process. If a preferred beam was not determined/selected in step 715, then processing proceeds to step 735, where a tracking resource is assigned/reassigned to the found beam.

Otherwise, if a preferred beam was determined in step 715, then processing proceeds from step 910 to step 915. Step 915 includes determining whether or not the candidate beam found in step 725 is better than the preferred beam determined in step 715. For example, step 915 includes determining whether the searcher energy of the found beam is greater than that of the preferred beam. If the found beam is not better than the preferred beam, then flow returns. Otherwise, the method steps or processing proceeds from step 915 to step 735, where the tracking resource is assigned/reassigned to the found beam.

Step 735 includes assigning one of fingers 310 to track the found beam. If all of fingers 310 are already assigned when step 735 is entered, then step 735 includes reassigning a finger from a tracked beam to the found beam. Otherwise, step 735 includes assigning an available finger to the found beam.

Figure 10:
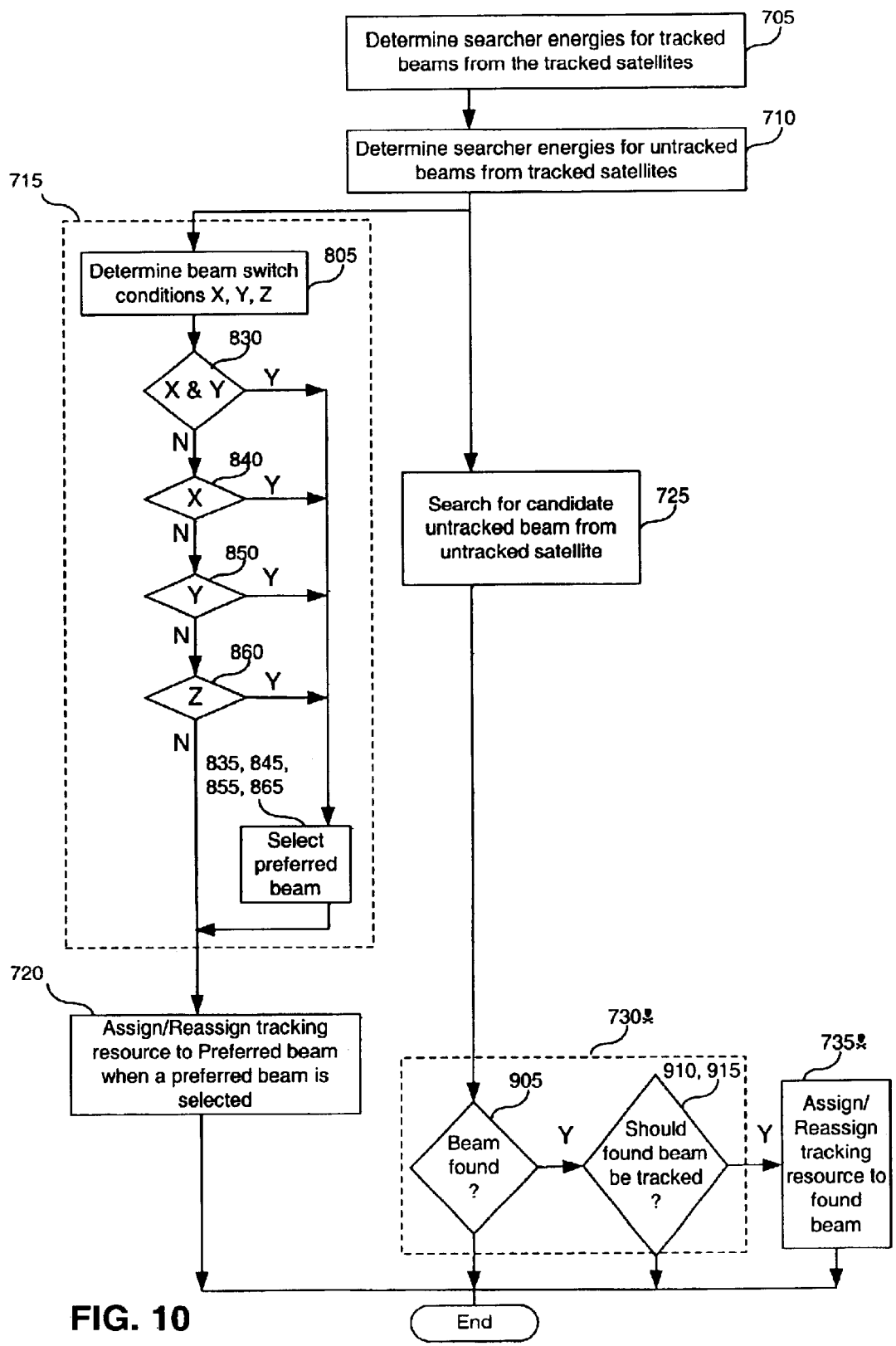
FIG. 10 is a summary flowchart corresponding to the methods of FIGS. 7, 8 and 9.

FIG. 10 is a flowchart summarizing methods 700, 800 and 900. Steps 730' and 735' depicted in FIG. 10 represent and expand slightly on respective steps 730 and 735 of FIG. 7.

Methods 700, 800, and 900 are described above in the context of scenario 600, for illustrative purposes only. It is to be understood that alternative satellite and receiver configuration scenarios are within the scope of the present invention. For example, the methods of the present invention also apply when only one satellite (for example, only the Active satellite), or alternatively, only two satellites (for example, only the Active and HB satellites) are being tracked. In these cases, the beam-switch conditions determined in steps 815–825 (X, Y, and Z), and the corresponding tests performed in steps 830–850, are modified as appropriate to correspond to the number of tracked satellites. For example, references to the HB satellite and the HO satellite (and their respective beams) are omitted when only the Active satellite is being tracked. Similarly, references to the HO satellite and its corresponding beams are omitted when only the Active and HB satellites are being tracked. Similarly, any number of fingers, such as one, two, three, or more fingers may be used in the present invention. More than three satellites may be tracked concurrently when more than three fingers are available. Also, a tracked satellite may originate only a tracked beam; that is, it might not originate any untracked beams. Also, the beam energies of the Active beam, HB beam, and HO beam might not be in a decreasing order.

B. Slotted Paging Operation

WCD 128 is considered to be in an idle state when it has acquired a communication system, is synchronized with system time in the communication system, and is, thus, capable of establishing a call with a base station or gateway, but no such call is in-progress. When in the idle state, WCD 128 can operate in a slotted paging mode. This paging mode provides a mechanism for delivering messages to WCD 128, while enabling the WCD to substantially reduce power consumption.

In the slotted paging mode, WCD 128 has the option of entering and then remaining in a power-conserving sleep state during relatively long periods of time. The sleep state reduces power consumption in WCD 128 by entering a power saving mode, which may include removing power from one or more components of WCD 128, such as those components used to transmit signals to and receive signals from the gateway. While in the sleep state, WCD 128 neither receives pilot signal 204 nor demodulates paging signal 208. However, to maintain time synchronization, a clock or timer (for example, timer 316) internal to WCD 128 may be used to maintain time.

WCD 128 periodically transitions from the sleep state to an awake state for a relatively short period of time to monitor paging signals (for example, paging signal 208) transmitted in the satellite beams. Paging signal 208 (also referred to as slotted paging signal 208) is time-divided into a repeating cycle of time slots. Each WCD within listening range of paging signal 208 (for example, WCD 128) is assigned to monitor typically only one time slot in each of the cycle of slots. A gateway can transmit messages to an intended WCD during the time slot assigned to that WCD.

When it is time to monitor the assigned slot, WCD 128 transitions from the sleep state to the awake state in order to receive and demodulate the paging signal (for example, a paging message included in the paging signal) during the assigned slot. When a period of time corresponding to the assigned slot has elapsed, WCD 128 transitions from the awake state back into the sleep state, and the WCD remains in the sleep state during generally all of the non-assigned slots of the paging signal 208. In this way, WCD 128 repetitively cycles between the sleep and awake states while operating in the slotted paging mode.

Figure 11:
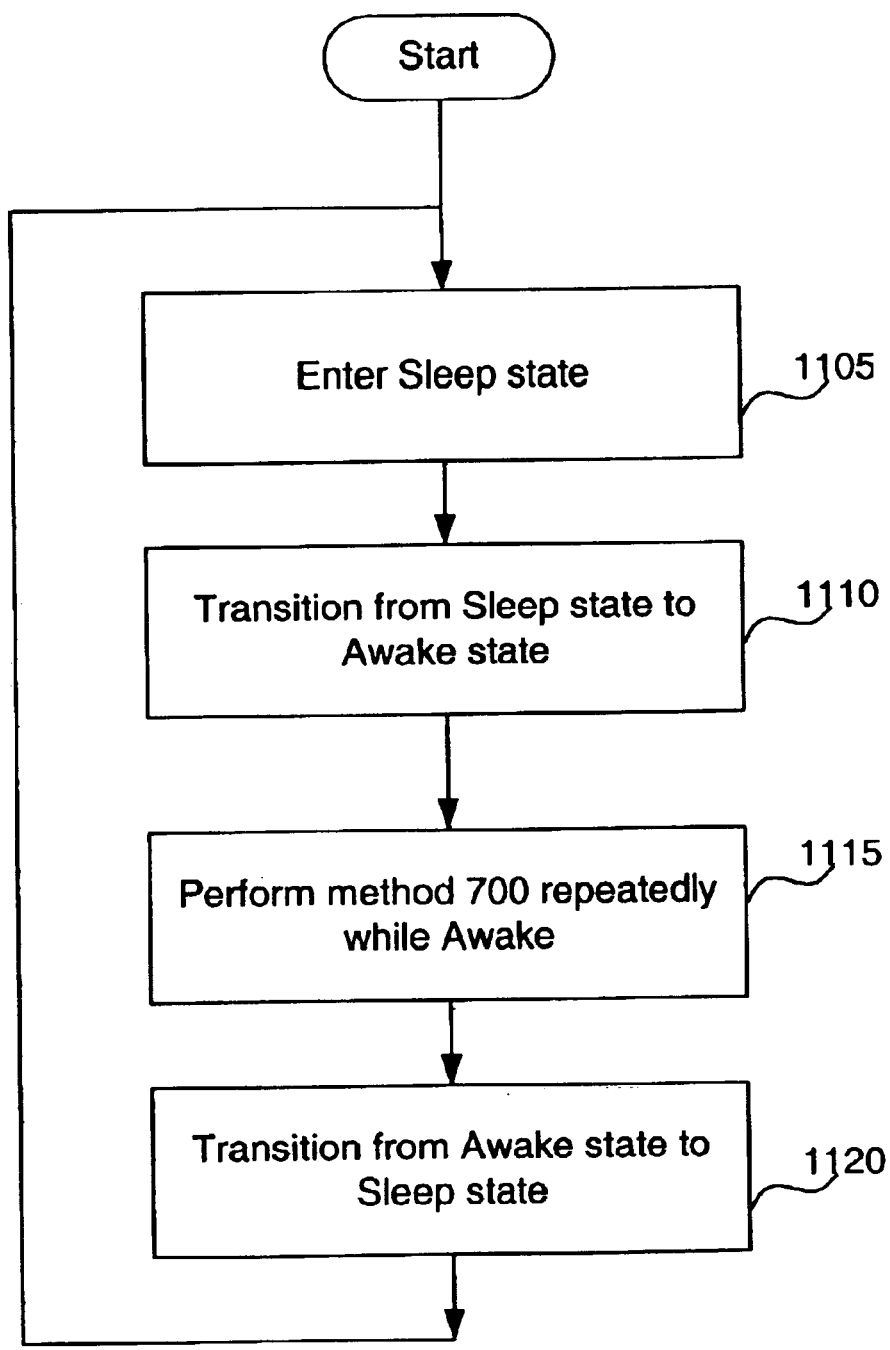
FIG. 11 is a flowchart of an example method of managing searcher and finger resources in the receiver of FIG. 3, while the receiver is operating in a slotted paging mode.

FIG. 11 is a flowchart of an example method 1100 of managing searcher and tracker resources in WCD 128 operating in the slotted paging mode. In a first step 1105, WCD 128 enters the sleep state and remains in this state during non-assigned slots of a paging signal (for example, paging signal 208) associated with the WCD. In a next step 1110, WCD 128 transitions from the sleep state to an awake state to monitor the slotted paging signal. In a next step 1115, WCD 128 performs method 700 repeatedly while the WCD is awake, to maintain connectivity with communications system 100 as different satellite beams sweep past the WCD over time. In a next step 1120, WCD transitions from the awake state back to the sleep state, and the method repeats.

Figure 12:
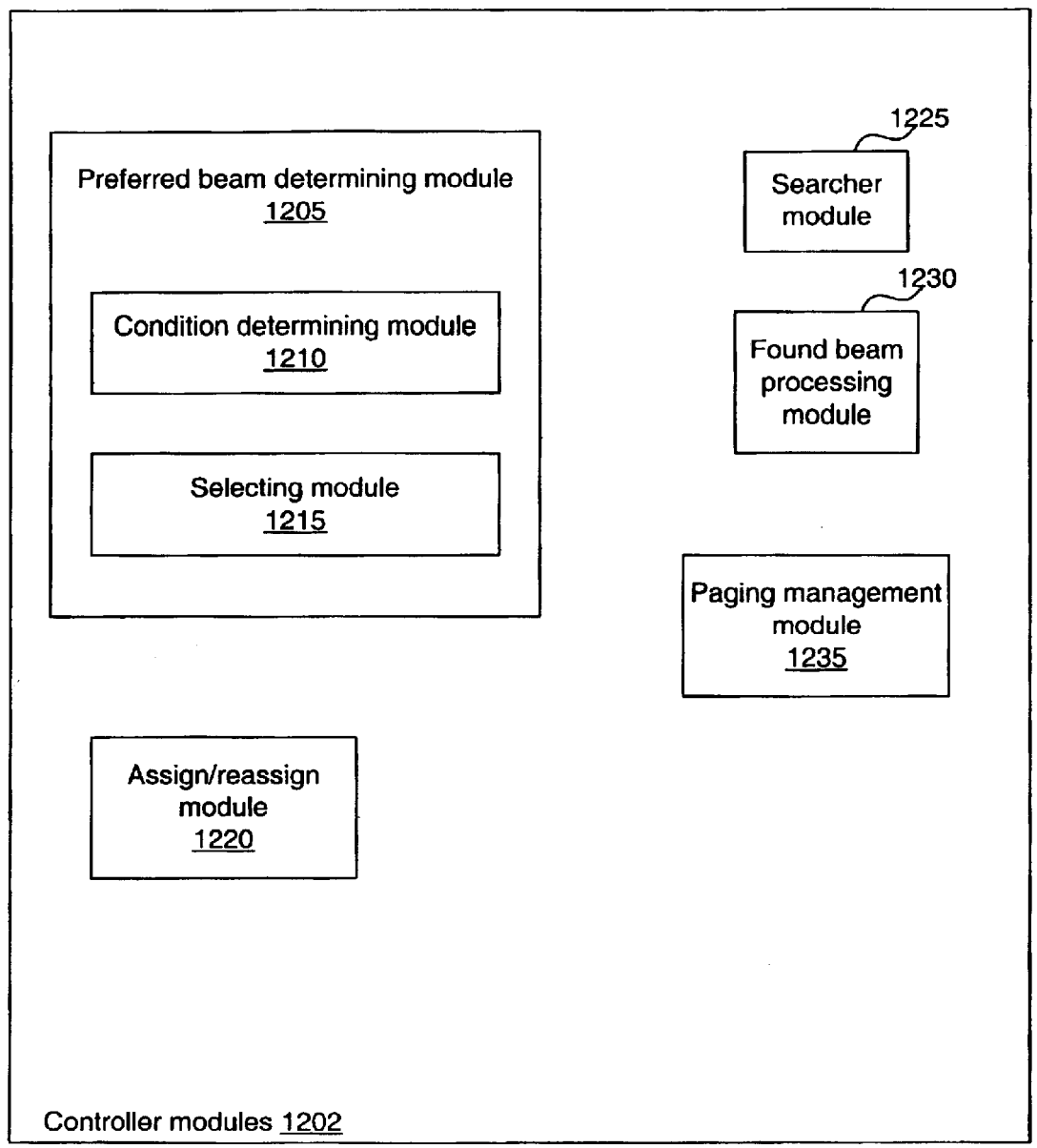
FIG. 12 is a block diagram of example controller modules used to control and manage a searcher and multiple fingers of the receiver of FIG. 3.

FIG. 12 is a block diagram of controller modules, generally referred to as controller modules 1202, for managing searcher 308 and fingers 310. Controller modules 1202 cause receiver 300 to implement methods 700–1100. Controller modules 1202 may be distributed across controllers 312 and 412. Controller modules 1202 include a preferred beam determining module 1205 for performing step 715 using searcher energies from searcher 308. Module 1205 includes a condition determining module 1210 for determining the beam-switch conditions of step 805, for example, conditions X, Y, and Z. Module 1205 also includes a selecting module 1215 for performing testing steps 830, 840, 850 and 860, and for selecting the preferred beam in steps 835, 845, 855 and 865.

Controller modules 1202 also include an assign/reassign module 1220 for performing assigning/reassigning steps 720 and 735, a searcher module 1225 for performing searching step 725, a found beam processing module 1230 for performing step 730, and a paging management module 1235 for controlling method 1100. The modules of controller modules 1202 use and control the resources of receiver 300, such as fingers 310, searcher 308, and so on, as necessary to implement the above described methods.

VI. Implementation

The embodiments can be implemented in hardware, software, firmware, and/or combinations thereof, including, without limitation, gate arrays, programmable arrays ("PGAs"), field PGAs ("FPGAs"), application-specific integrated circuits ("ASICs"), processors, microprocessors, micro-controllers, and/or other embedded circuits, processes and/or digital signal processors, software defined radios, and discrete hardware logic. Embodiments are preferably implemented with digital electronics but can also be implemented with analog electronics and/or combinations of digital and analog electronics.

Memory in the present invention, such as memories 314 and 414, include data memory for storing information/data and program memory for storing program instructions. Processors in the present invention, such as processors 312 and 412, perform processing functions in accordance with the program instructions stored in their respective memories. The processors can access data in their respective memories as needed. Additionally, or alternatively, the processors may include fixed/programmed hardware portions, such as digital logic, to perform some or all of the above-mentioned processing functions without having to access program instructions in their respective memories.

Computer programs (also called computer control logic) are stored in memories 314 and 414 or other memory. Such computer programs, when executed, enable WCD 128 to perform certain features of the present invention as discussed herein. For example, features of the flowcharts depicted in FIGS. 7 through 11, can be implemented in such computer programs. In particular, the computer programs, when executed, enable processors 312 and 412 to perform and/or cause the performance of features of the present invention. Accordingly, such computer programs represent controllers of the computer system of WCD 128, and thus, controllers of the WCD. Thus, such computer programs control or manage, for example, the searcher and finger resources of WCD 128, as described above. Also, the computer programs may implement the searcher and finger resources.

Where the invention is implemented using software, the software can be stored in a computer program product and loaded into WCD 128. The control logic (software), when executed by processors 312 and 412, causes processors 312 and 412 to perform certain functions of the invention as described herein.

VII. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention.

The previous description of the preferred embodiments is provided to enable any person skilled in the art to make or use the present invention. While the invention has been particularly shown and described with reference to preferred embodiments thereof, it will be understood by those skilled in the art that various changes in form and details may be made therein without departing from the spirit and scope of the invention.

The breadth and scope of the present invention should not be limited by any of the above-described exemplary embodiments, but should be defined only in accordance with the following claims and their equivalents.

What we claim as our invention is:

1. A method of managing beam tracker resources in a Wireless Communication Device (WCD) that tracks one or more tracked beams using the beam tracker resources, each of the one or more tracked beams originating from a respective one of one or more tracked transponders, comprising:
   (a) determining a tracked-beam (TB) searcher energy for each of the tracked beams;
   (b) determining an untracked-beam (UB) searcher energy for each of one or more untracked beams from each of the tracked transponders;
   (c) attempting to determine, based on the TB and UB searcher energies from steps (a) and (b), a preferred untracked beam among the one or more untracked beams that should become a tracked beam; and
   (d) assigning a tracking resource to track the preferred untracked beam when the attempt to determine the preferred untracked beam is successful.

2. The method of claim 1, wherein the one or more tracked transponders are either one or more tracked satellites, or one or more tracked base stations.

3. The method of claim 1, wherein step (c) comprises:
   (c)(i) determining whether a largest UB searcher energy for each of the tracked transponders exceeds a respective searcher energy threshold; and
   (c)(ii) if one or more of the largest UB searcher energies exceed their respective energy thresholds,
   then selecting, as the preferred untracked beam, the untracked beam having a largest UB searcher energy among the one or more largest UB searcher energies from step (c)(i).

4. The method of claim 3, wherein each of the respective searcher energy thresholds in step (c)(i) is based on a respective TB searcher energy.

5. The method of claim 3, wherein the WCD tracks first and second tracked beams from respective first and second tracked transponders, and step (c)(i) comprises:
   determining a first condition indicating whether the largest UB searcher energy for the first transponder exceeds a first searcher energy threshold that is based on the searcher energy for the first tracked beam; and
   determining a second condition indicating whether the largest UB searcher energy for the second transponder exceeds a second searcher energy threshold that is also based on the searcher energy for the first tracked beam.

6. The method of claim 5, wherein the first and second tracked transponders are first and second tracked satellites, respectively.

7. The method of claim 5, wherein step (c)(ii) comprises:
   if both the first and the second conditions are true, then selecting, as the preferred untracked beam, the untracked beam having the largest UB searcher energy among the untracked beams from the first and the second transponders.

8. The method of claim 5, wherein step (c)(ii) comprises:
   if the first condition is true and the second condition is not true, then selecting, as the preferred untracked beam, the untracked beam having the largest UB energy from the first transponder.

9. The method of claim 5, wherein step (c)(ii) comprises:
   if the second condition is true and the first condition is not true, then selecting, as the preferred untracked beam, the untracked beam having the largest UB energy from the second transponder.

10. The method of claim 3, wherein the WCD tracks first, second and third tracked beams from respective first, second and third tracked transponders, and step (c)(i) comprises:
    determining a first condition indicating whether the largest UB searcher energy for the first tracked transponder exceeds a first searcher energy threshold that is based on the searcher energy for the first tracked beam;
    determining a second condition indicating whether the largest UB searcher energy for either the second tracked transponder or the third tracked transponder exceeds a second searcher energy threshold that is also based on the searcher energy for the first tracked beam; and
    determining a third condition indicating whether the largest UB searcher energy for either the second tracked transponder or the third tracked transponder exceeds a third searcher energy threshold that is based on the searcher energy for the second tracked beam.

11. The method of claim 10, wherein the first, second and third tracked transponders are first, second and third tracked satellites, respectively.

12. The method of claim 10, wherein step (c)(ii) comprises:
    if both the first and the second conditions are true, then selecting, as the preferred untracked beam, the untracked beam having the largest UB searcher energy among the untracked beams from the first and the second transponders;
    if the first condition is true and the second condition is not true, then selecting, as the preferred untracked beam, the untracked beam having the largest UB energy from the first transponder;
    if the second condition is true and the first condition is not true, then selecting, as the preferred untracked beam, the untracked beam having the largest UB energy from either the second transponder or the third transponder;

if only the third condition is true, then selecting, as the preferred untracked beam, the untracked beam having the largest UB energy from either the second transponder or the third transponder.

13. The method of claim 1, wherein:
step (a) comprises integrating energy from multiple signals in each of the one or more tracked beams to produce the searcher energy for that tracked beam; and
step (b) comprises integrating energy from multiple signals in each of the one or more untracked beams to produce the searcher energy for that untracked beam.

14. The method of claim 1, wherein step (d) comprises reassigning a tracking resource from one of the tracked beams to the preferred untracked beam, when the attempt to determine the preferred untracked beam is successful.

15. The method of claim 1, further comprising:
(e) searching for a candidate beam from an untracked transponder.

16. The method of claim 15, further comprising:
(f) if the candidate beam is found in step (e), then tracking the candidate beam instead of the preferred untracked beam from step (d) when a searcher energy of the candidate beam exceeds the searcher energy of the preferred untracked beam.

17. The method of claim 15, further comprising:
(f) performing steps (d) and (e) concurrently.

18. The method of claim 15, wherein step (e) comprises:
integrating energy in a code-frequency search window corresponding to the candidate beam, to produce an energy estimate; and
determining that the candidate beam is found when the energy estimate exceeds a predetermined beam energy threshold.

19. The method of claim 1, wherein the searcher energies determined in steps (a) and (b) are all untracked energies.

20. The method of claim 1, wherein each of the tracked beams and each of the untracked beams includes one or more Code Division Multiple Access (CDMA) signals.

21. An apparatus for managing finger resources in a Wireless Communication Device (WCD), the WCD including multiple fingers that track one or more beams originating from respective ones of one or more tracked transponders, comprising:
an energy estimator adapted to
determine a tracked-beam (TB) searcher energy for each of the tracked beams, and
determine an untracked-beam (UB) searcher energy for each of one or more untracked beams from each of the tracked transponders;
means for attempting to determine, based on the TB and UB searcher energies from the energy estimator, a preferred untracked beam among the one or more untracked beams that should become a tracked beam; and
means for assigning one of the multiple fingers to track the preferred untracked beam when the attempt to determine the preferred untracked beam is successful.

22. The apparatus of claim 21, wherein the one or more tracked transponders are either one or more tracked satellites, or one or more tracked base stations.

23. The apparatus of claim 21, wherein the attempting means includes:
condition determining means for determining whether a largest UB searcher energy for each of the tracked transponders exceeds a respective searcher energy threshold; and
selecting means for selecting, as the preferred untracked beam, the untracked beam having a largest UB searcher energy among the one or more largest UB searcher energies, when one or more of the largest UB searcher energies exceed their respective energy thresholds.

24. The apparatus of claim 23, wherein each of the respective searcher energy thresholds used by the condition determining means is based on a respective TB searcher energy.

25. The apparatus of claim 23, wherein first and second fingers track respective first and second tracked beams from respective first and second tracked transponders, and the condition determining means comprises:
first condition determining means for determining a first condition indicating whether the largest UB searcher energy for the first transponder exceeds a first searcher energy threshold that is based on the searcher energy for the first tracked beam; and
second condition determining means for determining a second condition indicating whether the largest UB searcher energy for the second transponder exceeds a second searcher energy threshold that is also based on the searcher energy for the first tracked beam.

26. The method of claim 25, wherein the first and second tracked transponders are first and second tracked satellites, respectively.

27. The apparatus of claim 25, wherein the selecting means comprises:
means for selecting, as the preferred untracked beam, the untracked beam having the largest UB searcher energy among the untracked beams from the first and the second transponders, when both the first and the second conditions are true.

28. The apparatus of claim 25, wherein the selecting means comprises:
means for selecting, as the preferred untracked beam, the untracked beam having the largest UB energy from the first transponder, when the first condition is true and the second condition is not true.

29. The apparatus of claim 25, wherein the selecting means comprises:
means for selecting, as the preferred untracked beam, the untracked beam having the largest UB energy from the second transponder, when the second condition is true and the first condition is not true.

30. The apparatus of claim 23, wherein first, second and third fingers track respective first, second and third tracked beams from respective first, second and third tracked transponders, and the condition determining means comprises:
first condition determining means for determining a first condition indicating whether the largest UB searcher energy for the first tracked transponder exceeds a first searcher energy threshold that is based on the searcher energy for the first tracked beam;
second condition determining means for determining a second condition indicating whether the largest UB searcher energy for either the second tracked transponder or the third tracked transponder exceeds a second searcher energy threshold that is also based on the searcher energy for the first tracked beam; and
third condition determining means for determining a third condition indicating whether the largest UB searcher energy for either the second tracked transponder or the third tracked transponder exceeds a third searcher energy threshold that is based on the searcher energy for the second tracked beam.

31. The method of claim 30, wherein the first, second and third tracked transponders are first, second and third tracked satellites, respectively.

32. The apparatus of claim 30, wherein the selecting means comprises:
   first selecting means for selecting, as the preferred untracked beam, the untracked beam having the largest UB searcher energy among the untracked beams from the first and the second transponders, when both the first and the second conditions are true;
   second selecting means for selecting, as the preferred untracked beam, the untracked beam having the largest UB energy from the first transponder, when the first condition is true and the second condition is not true;
   third means for selecting, as the preferred untracked beam, the untracked beam having the largest UB energy from either the second transponder or the third transponder, when the second condition is true and the first condition is not true; and
   fourth means for selecting, as the preferred untracked beam, the untracked beam having the largest UB energy from either the second transponder or the third transponder, when only the third condition is true.

33. The apparatus of claim 21, wherein the energy estimator includes a correlator followed by an accumulator, the correlator and the accumulator being adapted to operate together to
   integrate energy from multiple signals in each of the one or more tracked beams to produce the searcher energy for that tracked beam, and
   integrate energy from multiple signals in each of the one or more untracked beams to produce the searcher energy for that untracked beam.

34. The apparatus of claim 21, wherein the assigning means includes reassigning means for reassigning a finger from one of the tracked beams to the preferred untracked beam when the attempting means determines the preferred untracked beam.

35. The apparatus of claim 21, further comprising:
   searching means, including the energy estimator, for searching for a candidate beam from an untracked transponder.

36. The apparatus of claim 35, wherein the assigning means includes means for assigning one of the multiple fingers to track the candidate beam from the untracked transponder when the searching means finds the candidate beam from the untracked transponder.

37. The apparatus of claim 36, wherein the assigning means further includes means for reassigning one of the multiple fingers from the preferred untracked beam determined by the attempting means to the candidate beam from the untracked transponder found by the searching means when a searcher energy of the candidate beam from the untracked transponder exceeds the searcher energy of the preferred untracked beam.

38. The apparatus of claim 35, wherein the attempting means and the searching means perform their respective functions concurrently.

39. The apparatus of claim 35, wherein the searching means includes:
   an energy estimator adapted to integrate energy in a code-frequency search window corresponding to the candidate beam from the untracked transponder, to produce an energy estimate; and
   means for determining that the candidate beam from the untracked transponder is found when the energy estimate exceeds a predetermined beam energy threshold.

40. The method of claim 21, wherein each of the tracked beams and each of the untracked beams includes one or more Code Division Multiple Access (CDMA) signals.

* * * * *